Jan. 2, 1940.   R. O. ANDERSON ET AL   2,185,491
HYDRAULIC BRAKING APPARATUS
Filed May 16, 1936   5 Sheets-Sheet 1
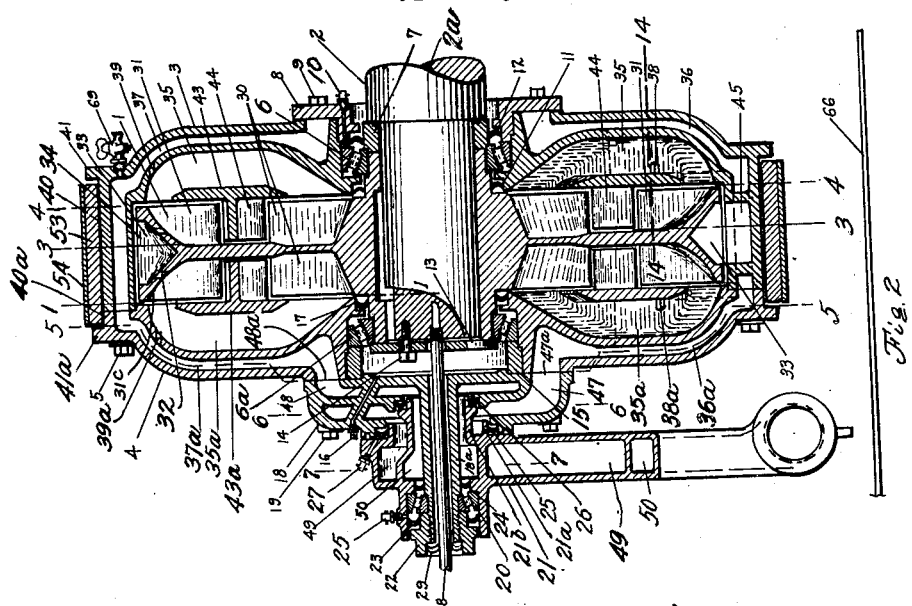
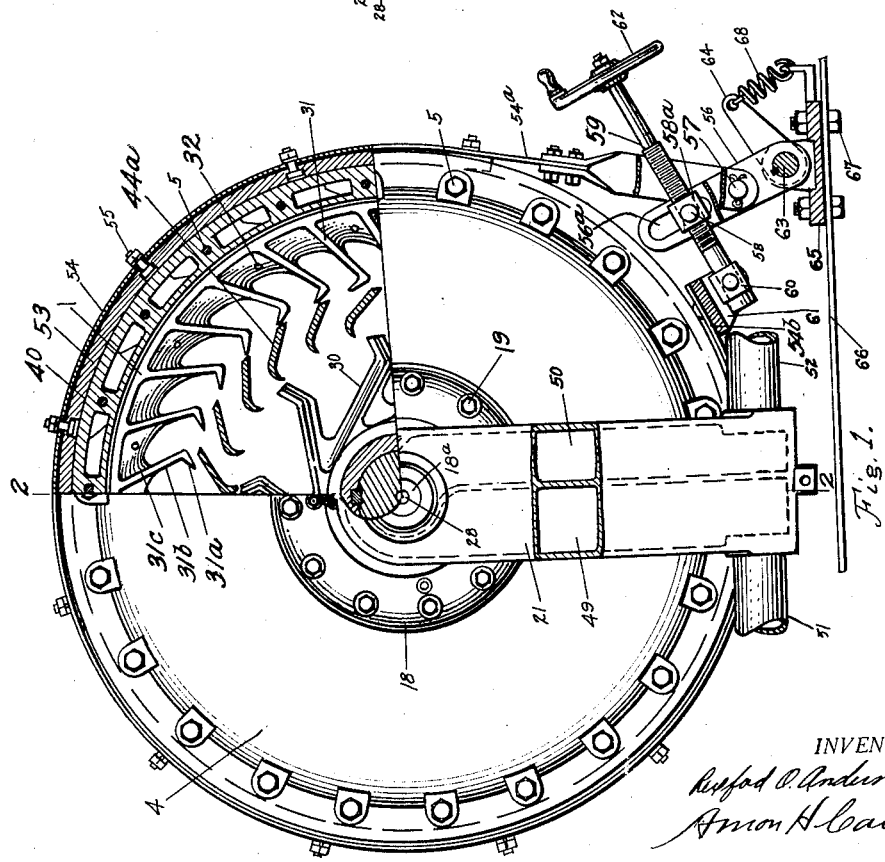
INVENTORS

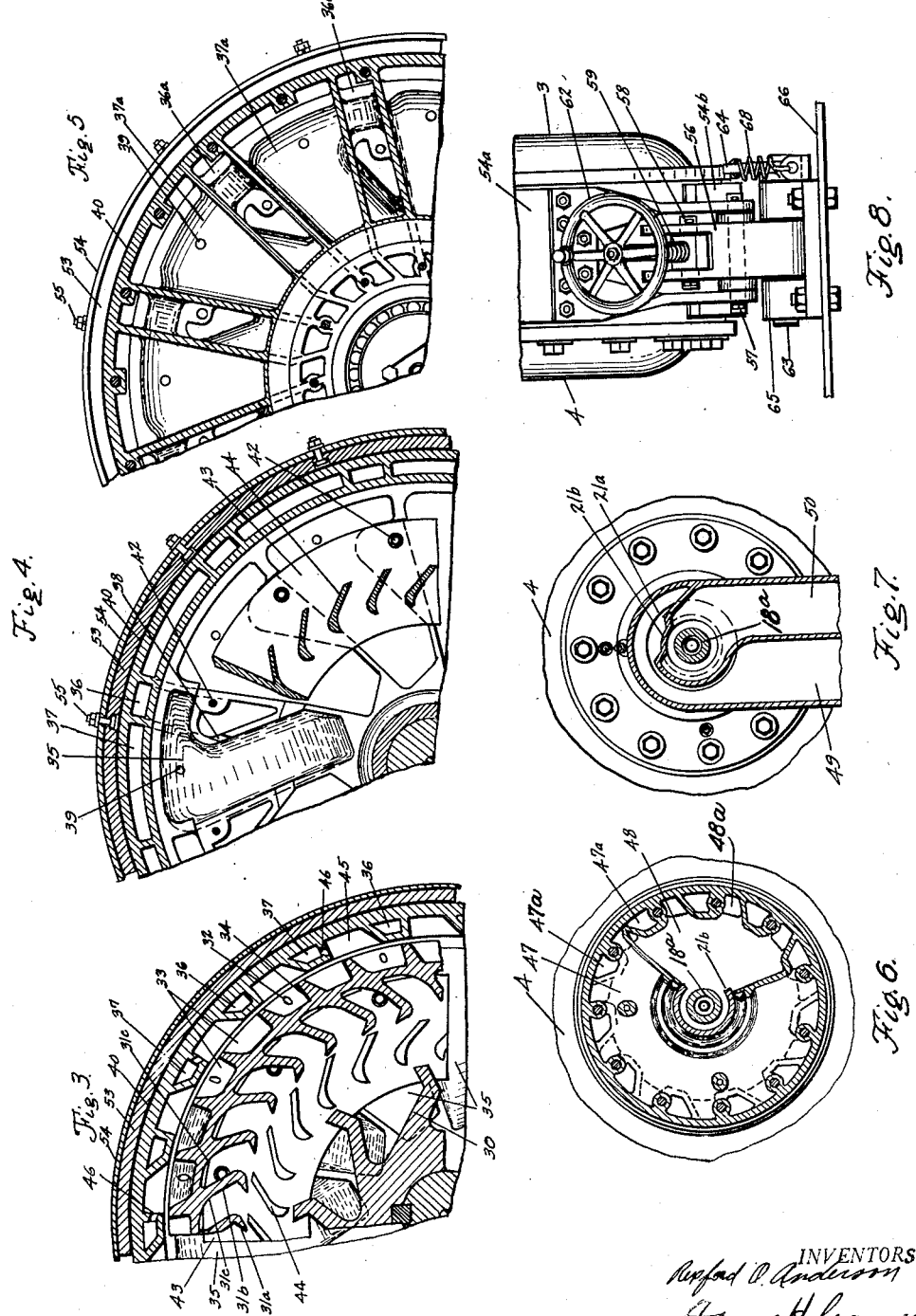

Jan. 2, 1940. R. O. ANDERSON ET AL 2,185,491
HYDRAULIC BRAKING APPARATUS
Filed May 16, 1936 5 Sheets-Sheet 3
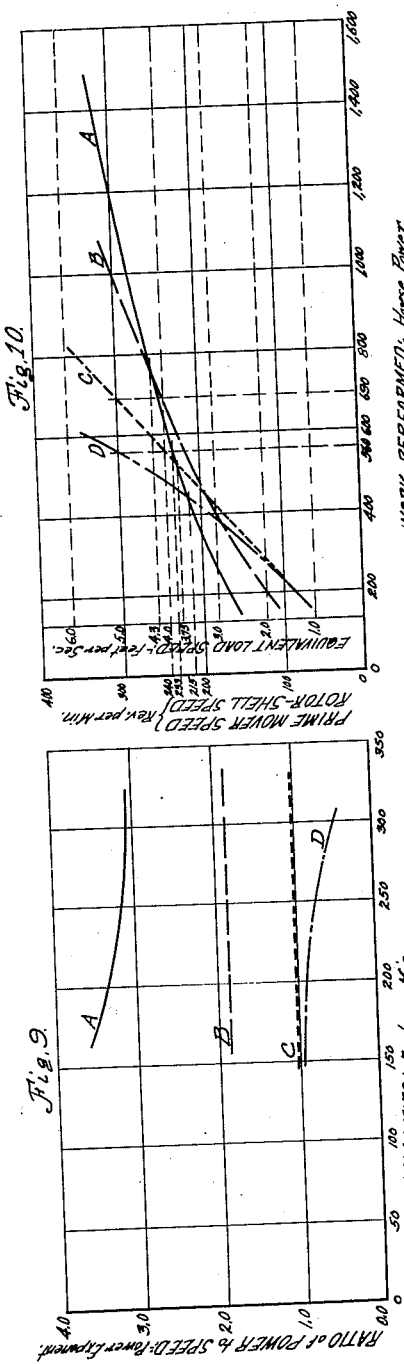
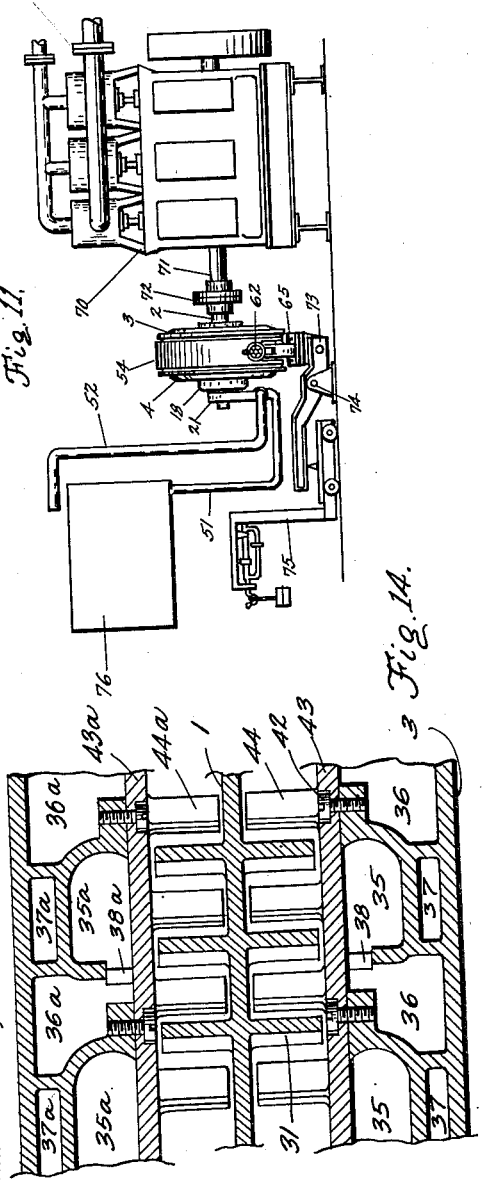
INVENTORS
Rexford O. Anderson,
Amon H. Carson Jan. 2, 1940.  R. O. ANDERSON ET AL  2,185,491
HYDRAULIC BRAKING APPARATUS
Filed May 16, 1936  5 Sheets-Sheet 5

INVENTORS
Rexford O. Anderson,
Amon H. Carson

Patented Jan. 2, 1940

2,185,491

UNITED STATES PATENT OFFICE 2,185,491

HYDRAULIC BRAKING APPARATUS

Rexford O. Anderson and Amon H. Carson, Oklahoma City, Okla.

Application May 16, 1936, Serial No. 80,092

11 Claims. (Cl. 188—90)

This invention relates to new and useful improvements in hydraulic braking apparatus.

In the performing of certain kinds of work, such as drilling of well bores, excavation, transfer equipment such as cranes, all types of hoists, and the control of heavily loaded trucks going down inclines, it is necessary to dissipate energy. This operation is commonly done in two ways, first, by the use of friction brakes operating over braking surfaces, and second, by the use of power to overcome the resistance of a non-reversing mechanism, such as worm gear drive units. In the testing of prime movers of relatively high speeds it is necessary to dissipate the energy of the prime mover. This work is commonly accomplished with the use of friction braking surfaces operating over pulleys, known as Prony brakes, and also by use of types of hydro-dynamometers. In the use of the friction type of brakes there are many disadvantages present, such as excessive heat of both the braking materials and the brake drums with subsequent wear and deterioration. There is also the unsteady operation of the friction surfaces which set up vibrations and shock loads on the parts of all the machinery and equipment involved. In the use of the Prony brake for high speeds, this excessive heat causes uneven gripping of the pulley, resulting in incorrect power reading. In the use of dynamometers, the internal friction losses of the water circulation with improper cooling water circulation makes the use of constants, of constantly changing size, necessary in ascertaining the correct power dissipated. This is unsatisfactory.

This invention is a tested and proven apparatus containing certain new and novel features for the use of a liquid, such as water, as a medium for the transmission and dissipation of energy in the form of motion from the source of power, into the form of heat in the liquid, or into both heat in the liquid and motion of part of the apparatus which is under control.

An object of this invention is to provide an apparatus suitable to be operated full of the liquid and under all conditions and for any portion of its capacity desired.

A further object of this invention is to provide an apparatus using a liquid as a means for the dissipation of energy in the form of heat and which automatically maintains operative temperatures of the liquid in use by simultaneously discharging a portion of the heated liquid and replacing it with equal amounts of cool liquid, without affecting the work capacity of the apparatus.

A further object of the invention is to provide an apparatus wherein a maximum amount of work can be obtained with an apparatus of minimum size and operating at a minimum speed by the use of features whereby velocities of the liquid circulated become greater than that of the actuating moving parts.

A further object of the invention is to provide an apparatus wherein the energy transmitted to it is transferred to the liquid mainly in the form of kinetic energy and dissipated as such by directly changing its direction of travel as far as is operatively possible.

A further object of the invention is to provide an apparatus for the dissipation of energy, where a large portion of the energy dissipated is not transferred to the inclosing portion of the apparatus in the form of torque.

A further object of the invention is to provide an apparatus in which a liquid is used for the dissipation of energy, the power of which is controlled at will without affecting the quantity of water used.

A further object of the invention is to provide an apparatus using a liquid for the dissipation of energy which dissipates this energy automatically when operating in only one direction of rotation, and which automatically ceases to dissipate energy when operating in the opposite direction.

A further object of this invention is to provide energy dissipating equipment having different and controllable ratios of speed-power dissipating characteristics.

A further object of the invention is to provide an apparatus using a liquid for the dissipation of energy easily and cheaply constructed suitable for installation on any type of equipment requiring the dissipation of energy in its operation.

With the above and other objects in view the invention has particular relation to certain novel features of construction, operation, and arrangement of parts, an example of which is given in this specification and illustrated in the accompanying drawings, wherein:

Figure 1 shows a side elevation of the apparatus with a part sectional view on the line 1—1 of Figure 2 and showing the outer wall of the water manifold partly broken away.

Figure 2 shows a sectional elevation of the apparatus on the line 2—2 of Figure 1.

Figure 3 shows a part sectional elevation of the apparatus on the line 3—3 of Figure 2.

Figure 4 shows a part sectional elevation and part cut-a-way view of the apparatus on the line 4—4 of Figure 2.

Figure 5 shows a part sectional elevation of the apparatus on the line 5—5 of Figure 2.

Figure 6 shows a part sectional elevation and part cut-a-way view of the apparatus on the line 6—6 of Figure 2.

Figure 7 shows a part sectional elevation and part cut-a-way view of the apparatus on the line 7—7 of Figure 2.

Figure 8 shows a part front elevation of the apparatus.

Figure 9 shows a chart designating the relation between the power and speed.

Figure 10 shows a chart designating the relation between speed and work performed.

Figure 11 shows an application to energy transfer equipment, such as prime movers.

Figure 14 shows a fragmentary sectional view, taken on the line 14—14 of Figure 2.

Figure 12:
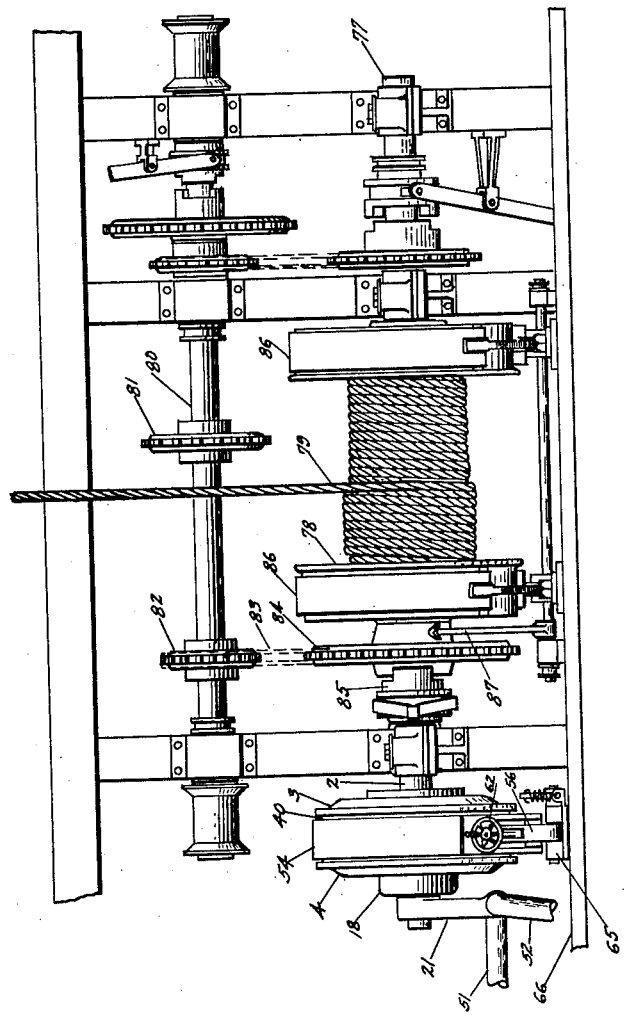
Figure 12 shows an application to load handling means, such as hoisting equipment.

Referring more particularly to the drawings wherein like numerals of reference designate similar parts in each of the figures, 1 is a rotor which is keyed upon the shaft 2 which transmits to the rotor the energy to be dissipated. The shell body 3 and the shell cover 4, when bolted together by the bolts 5, form a shell and completely inclose the rotor 1, and are rotatively connected to it by means of the roller bearings 6 and 6a. The roller bearing 6 is held in place in the shell body 3 by means of the spacer ring 7, and the retaining plate 8 which is bolted to the shell body by means of the cap screws 9. This bearing is lubricated through the fitting 10, which lubricant is confined from the chamber formed between the shell body and rotor by means of a seal ring 11, and is confined from the outside by the seal ring 12. The roller bearing 6a, connecting the rotor to the shell cover, is held in place by means of the retaining plate 13 bolted to the shaft end by the bolts 14, and the spacer ring 15. The bearing 6a is lubricated through the fitting 16, and is sealed from the chamber formed between the shell cover and rotor by the seal ring 17. The circulating water header 18 is bolted to the shell cover 4 by means of the bolts 19. Rotatively connected to the water header by means of the bearing 20, is the circulating water manifold 21. The bearing 20 is held in place by the nut 22, and is sealed from the atmosphere by the seal ring 23, and from the inside of the water manifold by the seal ring 24. The bearing is lubricated through the fitting 25. The water manifold 21 is further rotatively connected to the water header 18 by means of the outer projecting sleeve 21a, rotating in the seal ring 25, and also the inner sleeve 21b, rotating in the seal ring 26. The connection between the outer sleeve 21a and the water header 18 is lubricated through the fitting 27. The water header stem 18a is shown as hollow to accommodate the pipe 28, connecting a cooling water supply with the bore 2a, sometimes used in shafts of water cooled brake drums on hoisting equipment. The seal ring 29 seals grease about the bearing 6a from the atmosphere. The rotor 1 has formed about its hub the impellers 30, arranged in a tangential direction with respect to the hub. The rotor 1 has formed about its periphery the impellers 31, the inner ends, or toes, 31a being formed tangentially to the hub in the direction of the inner impellers 30. The outer ends of the impellers 31, have the faces 31b formed in a tangential direction with the hub and make an obtuse angle with the faces of the inner ends 31a, also the longitudinally inclined surfaces 31c which incline outwardly as the distance from the center of the rotor increases. The surfaces 31c are perforated with the holes 32, which connect the inner spaces of the rotor with the outer cored pockets 33, formed between the faces 31c and the baffle surfaces 34.

The shell body 3 has formed in its inside surfaces the circulation channels 35, the outer ends of which are circular at approximately the outer diameter of the rotor surfaces 31c, and the bodies of which extend inwardly at an angle with the radius of the shell body and at approximately a right angle with the faces of the rotor impellers 30. The bottoms of the inner ends of the shell channels are inclined inwardly toward the rotor impellers 30 causing the bodies of the shell channels to merge with the spaces between the rotor impellers at the rotor hub. Formed between the inner surfaces of the shell body forming the channels 35, and the outside shell of the shell body are the cooling water channels consisting of one suction channel 36 and one discharge channel 37, for each channel 35, the suction channel 36 being connected to the channel by the port 38, and the discharge channel being connected to the channel 35 by the port 39. The inner periphery of the shell body 3 forms a case surrounding the rotor 1, while the outer periphery forms the circular brake surface 40, one side of which is bounded by the rim 41.

The shell cover has formed in it also, circulation channels 35a, suction channels 36a, discharge channels 37a, suction ports 38a, discharge ports 39a, brake surface 40a, and brake rim 41a, similar to and corresponding with the respective parts in the shell body.

Inserted in the inner face of the shell body 3, and bolted to it by the cap screws 42, is the deflecting vane ring 43. Formed on the face of the deflecting vane ring 43, are the deflecting vanes 44, which extend inwardly between the outer ends of the rotor impellers 30, and the inner ends of the rotor impeller vanes 31. The inner edge of the deflecting vane faces start in a radial direction and extend outwardly in a tangential direction, being approximately parallel with the faces of the rotor impeller faces 30 and 31a. Inserted in the inner face of the shell cover 4, and bolted to it by means of cap screws similar to the bolts 42, is also the deflecting vane ring 43a similar to and corresponding with the deflecting vane ring 43, with the deflecting vanes 44a similar to and corresponding with those 44. Located in the inner periphery of the shell body are the pockets 45 which are formed between the alternate suction and discharge channels 36 and 37, respectively, and correspond in width with the pockets 33 of the rotor 1, alternate ones of these pockets 45 being connected with the discharge channels 37 by means of the ports 46.

The cooling water header 18 has formed within it, two cooling water chambers; namely, the suction chamber 47 and the discharge chamber 48. The two have alternately located ports, 47a and 48a respectively, connecting with the corresponding suction channels 36a and discharge channels 37a in the shell cover 4.

The cooling water manifold 21 has formed in it, two cooling water chambers; namely, the suction chamber 49, and the discharge chamber 50, which at the connection with the water header 18, connect with the suction chamber 47, and discharge chamber 48 respectively. The suction chamber 49 at the other end connects with the water feed conduit 51 which connects it with an outside water supply not shown, while the discharge chamber 50 connects with a discharge conduit 52, which runs to a point of disposal for the used water, not shown.

Partially surrounding the shell braking surfaces 40 and 40a is the brake lining 53 which is connected to the brake band 54 by the bolts 55. The anchor end 54a of the brake band 54 is connected rotatively with the main braking link 56, by means of the pin 57. The snub end 54b of the brake band 54 is connected also to the main link 56 toward its free end by the trunnion 58 (shown to fit in the slot 56a of the link 56), the adjusting screw 59, the crosshead 58a, through which screw 59 is threaded, the crosshead 60, in which the screw 59 is free to rotate, and the bearing 61. The adjusting screw 59 is rotated by means of the hand wheel 62. The fixed end of the main braking link 56 is keyed to the shaft 63. The lever 64 is also keyed to the shaft 63, which is rotatively supported by the bearings 65, which are in turn fixed to the floor 66 by the bolts 67. The outer end of the lever 64 is flexibly connected to the bearing plate 65 by means of the tension spring 68.

In operation the hydraulic brake dissipates power when the rotor 1 is rotated in a counterclockwise direction in Figure 1. Preliminary to placing the brake into service the liquid, say for example, water is admitted through the conduit 51 into the suction chamber 49 of the manifold 21, from where it passes into the suction chamber 47 of the water header 18, passing out through the ports 47a into the suction channels 36a of the shell cover 4, filling the circulation channels 35a through the suction ports 38a. From the shell cover 4 the water passes through the suction channels 36 of the shell body 3, passing through the suction ports 38 and filling the channels 35. In this way the entire space between the shell body, shell cover and the rotor is completely filled with water, the air present being discharged through the vent cock 69, which is later closed. As the chamber is filled the water flows through the discharge ports 39 and 39a, filling also the discharge channels 37 and 37a. From the shell cover the water flows through the header discharge ports 48a filling the discharge chamber 48 of the header and passes into the discharge chamber 50 of the manifold 21 and on out the discharge conduit 52, the end, see on Figure 11, of which runs to a level higher than the highest point of the shell and causes the shell to be kept full of the water.

The power dissipated by the hydraulic brake is in proportion to the relative velocities of rotation of the rotor and shell. This necessitates the rotation of the shell being retarded which is accomplished by the use of the conventional friction type of brake band 54. The frictional resistance of the brake band is in proportion to the coefficient of friction of the brake lining 53, the angle of wrap about the brake surface of the shell, and the force applied to the snub end 54b of the brake band. The brake band is so constructed that when it is in contact with the entire surface of the brake surface 40 and 40a throughout the angle of wrap, by adjustment of the adjusting screw 59, the spring 68 is in tension sufficient to hold the band in contact with the brake surfaces. We will assume that the coefficient of friction of the brake lining and the angle of wrap causes the force applied to the snub end 54b to transmit four times as much force to the anchor end 54a, thus causing a tangential pull on the shell of 4 less 1 or 3 times the force applied on the snub end 54b. Then, in order that the brake mechanism might be self-locking, the adjusting screw 59 is adjusted to make the component leverage of trunnion 58 to shaft 63 equal to not more than four times that of the pin 57 to shaft 63, on the anchor end 54a of the brake band. This arrangement with the initial pull administered by the spring 68 on the snub end 54b will cause this pull to be administered through the ratio of 4 to 1 to the anchor end 54a which acts through the leverage ratios of 4, or less, to 1 to build up a greater pull on the end 54b until the force on the end 54a less the force on 54b equals and balances the tangential force on the shell braking surface, at which time the shell is held stationary and the hydraulic brake will dissipate its greatest amount of energy. Increase of the leverage ratios by either unscrewing the adjusting screw 59, or rotating the trunnion 58 upwardly, by raising the hand wheel 62, will lessen the power administered to the snub end 54b by the anchor end 54a and cause them to not balance the tangential force on the shell surface. This will allow the shell to rotate, the speed of which depends upon the leverage ratio used. In this manner any portion of the power transmitted to the hydraulic brake through the shaft 2 can be dissipated as desired.

With the brake mechanism adjusted by means of the adjusting screw 59 as above described to retard the rotation of the shell and dissipate the power desired, the power administered to the rotor 1 by any load handling means through the shaft 2, causes the rotor to rotate in a counterclockwise direction. This rotation causes the inner impellers 30, and the peripheral impeller surfaces 31a to act as centrifugal pump impellers and start movement of the water in an outward tangential and radial direction. The impellers 30 forcing the water through the deflecting vanes 44 and 44a changes the direction of the water to a clockwise direction and opposite to that of the impeller vanes 31. The angle at which the impeller faces 31a are set forces the water with a velocity, in proportion to their angle and tangential velocity, in an outward radial direction and it impinges against the impeller faces 31b where the radial component velocity of the water is decreased with the consequent dissipation of a proportional amount of kinetic energy on the impeller faces 31b. The longitudinally inclined surfaces 31c catch the water with its small amount of retained radial velocity and transmit to it a longitudinal and tangential velocity in proportion to its radial velocity and the angle and tangential velocity of the impeller faces 31c. The water is thus forced longitudinally and tangentially out into the shell circulation channels 35 and 35a, where it impinges upon the inwardly curved surfaces of the bottom, and side of the channels and where the direction of the water is changed into an inward radial and reverse tangential direction, giving up its kinetic energy to the shell. The water then flows toward the center of the shell where it is directed inwardly against the faces of the rotating impellers 30, and the above described cycle is repeated. As the rotor speed increases the consequent velocities of the rotor parts and water increases to a point where turbulent flow conditions exist. The sharp reverses in the direction of the water cause the setting up of low pressure areas. These points exist behind the deflecting vanes 44 and 44a and in the turn of the shell channels where the suction ports 38 and 38a are located. These low pressure areas with the heat generated in the dissipation of energy and the consequent tendency to generate vapors in the recurrently circulated water tends to change some of the water from a non-compressible liquid to a compressible fluid. This results in an increase in volume of the liquids thus causing it to attain speeds greater than that of the actuating parts, and causing its direction of travel to be in a comparatively straight line from the point where it impinges, instead of following in the direction of the confining surfaces. This characteristic has proven by actual tests to cause velocities of the water to be in proportion to the square root of the sum of the squares of its original velocity and the velocity of the moving parts. Since the power transmitted by the water is in proportion to the square of its velocity, these features providing for this characteristic enhance the energy dissipated in proportion.

The presence of the discharge ports 39, and 39a, (in the shell channels) in the direct path of the water being discharged longitudinally from the rotor impeller surfaces 31c allows a proportionate amount of water to be discharged into the discharge channels 37, and 37a. Simultaneously the radial velocity of the water over the impeller faces 31c also discharge a proportionate amount of water into the rotor pockets 33, where it is discharged tangentially by the rotor pocket baffle surfaces 34 into the shell pockets 45, and a proportionate part is discharged through the port 46 into the discharge channels 37 also. With the consequent velocity head pressure the water thus discharged passes on out through the connecting ports and chambers in the water header and manifolds into the conduit 52 to a convenient point of disposal as, for example, shown in Figure 11. The low pressure area created at the location of the suction ports 38 in the shell body and 38a in the shell cover simultaneously induces the flow of water from the suction channels 36 and 36a and the connecting suction chambers and ports into the shell channels 35 and 35a to replace the water discharged as above described and lower the temperature of the water being used to dissipate energy.

Tests of this invention in operation show that the power dissipated by the invention varies directly as approximately the third power of the relative speed of rotation of the rotor and shell, as designated by curve A of Figure 9. The power generated by a uniformly accelerated load, such as a falling body, increases approximately as the square of its velocity as designated by the curve B, Figure 9. The power generated by a constant speed falling load varies directly as the first power of its velocity, as designated by the curve C, Figure 9. The power generated by a prime mover changes, varying from the first power to less than the first power of the speed of rotation as designated by the curve D, Figure 9. Consequently, the work performed by the equipment mentioned can be represented on the chart Figure 10, in which the ordinate represents the hydraulic brake rotor speed minus the shell speeds, and also the prime mover speeds in revolutions per minute, also load velocities in feet per seconds. The abscissa represents the work performed in horse power. The curve A represents the work performed by the hydraulic brake. The curve B represents the work done by a load falling with uniformly accelerated velocity. The curve C represents the work done by a load falling at constant velocity. The curve D represents the work done by a prime mover. It will be obvious that each of the curves B, C, and D, must intersect the brake curve A. At their individual points of intersection is noted the speeds at which they will be maintained by the hydraulic brake. The uniformly accelerated load of curve B will be maintained at a speed of 43 feet per second. The constant speed load of curve C will be maintained at 3.75 feet per second. The prime mover of curve D will be maintained at a speed of 215 R. P. M.

In case it is desired to allow the uniformly accelerated load of curve B to be lowered at a speed of 5 feet per second which represents work of 1,000 H. P. and a rotor speed of 300 R. P. M. and since the hydraulic brake dissipates 1,000 H. P. at 280 R. P. M., it will be necessary to adjust the leverage ratio of the brake mechanism aforementioned by means of adjusting the screw 59 or raising the hand wheel 62, to allow the brake shell to rotate 300 minus 280, or 20 R. P. M. Likewise the uniform velocity falling load, of curve C, to be allowed to fall at 5 feet per second and generate 690 H. P., the shell would be allowed to rotate at 300 minus 240, or 60 R. P. M. Also to allow the prime mover of curve D to run at 300 R. P. M. and generate 560 H. P., the hydraulic brake shell would be allowed to rotate at 300 minus 233, or 67 R. P. M. In this way the invention is made entirely flexible in its scope of power dissipation through the adjustment of the leverage ratio of the braking mechanism, the brake band, and the floating shell 3 and 4.

In the case of hoists, elevators, cranes, etc. where it is necessary to reverse the direction of rotation of the shaft 2, in order to wind in the cable or raise a load it is desirable to have no dissipation of energy by the hydraulic brake. To accomplish this the brake shell 3 and 4 is allowed to rotate, being automatically released by the shells turning in a clockwise direction with only the resistance caused by the tension of the spring 68. The first movement of rotation of the rotor in a clockwise direction transmits the energy of the movement through the frictional resistance of the water to the shell 3 and 4 causing a tangential pull in that direction on the snub end 54b of the brake band. This tangential pull readily overcomes the tension of the spring 68 and causes the main link 56 to rotate to the left, about the shaft 63. The leverage of the adjusting crosshead trunnion 58 about the shaft 63 being larger than that of the anchor end pin 57, and the snub end 54b being stationed tangentially to the main link 56, as is not the case of the anchor end 54a, the movement of the snub end 54b, tending to lengthen the brake band unit about the shell, will be considerably greater than the movement of the pin 57 which tends to shorten the brake band unit. Thus the brake band unit is lengthened and the brake band is partially released from the braking surface 40 of the shell and the shell is free to rotate with the rotor dissipating no energy and causing no resistance to the movement of lifting the load. This is extremely beneficial in the case of handling drill pipe in drilling well bores.

The application of the invention to prime movers for use in testing and breaking in such equipment is portrayed in Figure 11, wherein the prime mover 70 is connected by its shaft 71 by means of the coupling 72 to the hydraulic brake shaft 2. The braking mechanism is connected to the lever 73 through bearing 65. The lever 73 pivots on the fulcrum 74 and its other end rests on the scale 75. In operation water is supplied from the tank 76 through the suction conduit 51 to the manifold 21, and is discharged through the conduit 52 up and over to the point of disposal, here shown as the tank 76. The testing can be made at any speed and at any power by regulation of the brake mechanism leverage ratio through adjustment of the hand wheel 62 allowing the shell 4 to rotate. The speed-power ratio of the brake, when the shell 4 rotates, becomes approximately the same as that of the prime mover. This allows the prime mover to be operated at any speed desired with constant water conditions in all cases. The measurement of power generated by the prime mover is calculated by the methods used in hydro-dynamometers with the shell stationary or with those used in Prony brakes with the shell rotating.

The application of the invention to a hoist is portrayed in Figure 12, wherein the shaft 2 is an extension of the drum shaft 77 on which is mounted the cable winding drum 78, carrying the cable 79 which runs over a crown pulley, not shown, and carries the loads to be handled. Power is applied by a prime mover, not shown, to the line shaft 80 by a chain through the sprocket 81. It is then transmitted through the sprocket 82, the chain 83, the sprocket 84, the clutch 85 to the drum shaft 77, and thus to the drum 78 which is keyed thereon. The raising of the load requires the drum and drum shaft to be rotated in a clockwise direction. This action automatically releases the brake band 54 from the braking surface 40 allowing the hydraulic brake shell 3 and 4 to rotate clockwise with the rotor 1 as above described. When the load is lifted to its highest point the prime mover is stopped, causing the cable drum to come to rest. The manual brakes 86 are applied by the brake lever 87, and the load is brought in position to be lowered. The clutch 85 is then disengaged, disconnecting the prime mover from the cable drum, and allowing the manual brakes 86 to carry the entire load. The load is lowered by releasing the manual brakes and allowing the load to rotate the cable drum, drum shaft 77, the shaft 2, and the rotor 1 in a counter-clockwise direction. This causes the hydraulic brake mechanism to automatically operate to resist the rotation of the shell to the extent that the hand wheel 62 and adjusing screw 59 has been adjusted. As the speed of the load and cable drum increases its power generated will increase as approximately the square of the speed, while the power dissipated by the hydraulic brake increases as approximately the cube of the relative speed of the rotor and shell. When the power dissipated by the hydraulic brake comes to equal that of the load, the speed will remain constant since for the load to fall faster it must generate more power, but in generating more work it must furnish a greater amount of work for the hydraulic brake to dissipate. This being impossible the two balance and thus the speed of the load remains constant until it is desired to stop it. The manual brakes are then applied bringing the load to rest. Adjustment of the hand wheel 62, and the screw 59, with the crosshead 58a in fixed relation to the link 56, which allows the shell to rotate for an initial load speed, can be made such that the coefficient of friction will increase between the brake lining 53, and the braking surface 40 due to the heat generated between them. This increase in friction can be sufficient to appreciably retard the rotation of the shell 4. This retardation in turn increases the relative rotative speeds of the shell and rotor, increasing the power dissipated by the brake, and consequently retards the speed of the load. In this manner, it is possible to speed up the lowering of a load by allowing high initial speed and automatically retarding the load speed to a minimum before it is necessary to apply the manual brakes to stop the load. For example, this braking equipment has been thus adjusted to lower drill pipe 90 feet at a time, with the first 75 feet being lowered at a rate of 12 feet per second and this speed being automatically lowered to 4 feet per second within the next 10 feet, at which time the manual brakes may be applied to bring the drill pipe to a stop. In this operation only a small portion of the energy dissipated in holding the load in leash has been dissipated by the manual brakes. The largest portion has been dissipated by the hydraulic brake in the form of heat transmitted to the water, which has been replaced by fresh water as the work was dissipated as above described.

Figure 13:
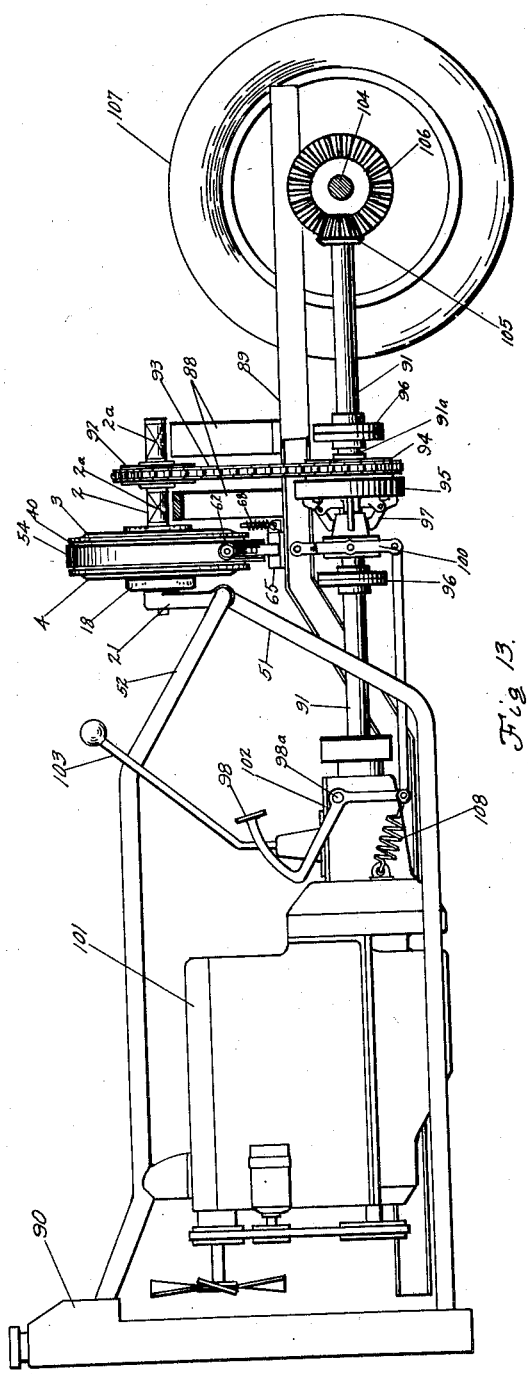
Figure 13 shows an application to a moving mass, such as a motor vehicle.

The application of the invention to vehicles operating under conditions where the use of braking power is necessarily extensive, such as trucks on mountainous roads, is portrayed in Figure 13. The hydraulic brake shaft 2, is mounted on bearings 2a on supports 88, attached to the frame 89. The circulating manifold suction chamber is connected by the conduit 51 to the radiator 90, as is likewise the discharge conduit 52, thus allowing the water to be circulated and cooled in the radiator. The rotor shaft 2 is connected to the vehicle drive shaft 91 by means of the sprocket 92, the chain 93, the sprocket 94, which is connected to the clutch 95, and is free to rotate on the drive shaft 91a, shown as inserted into the drive shaft 91 by means of the couplings 96. The clutch drum 95 is selectively driven by the shaft 91a through the clutch mechanism 97, keyed to the shaft 91a, and operated by the foot pedal 98 pivoted at 98a, which actuates the reach rod 99, and the yoke 100. The drive shaft 91 and 91a is the conventional means of transmitting power from the engine 101 through the transmission 102, selectively operated by the gear shift lever 103, to the axle 104, through the differential gearing 105 and 106, to the wheels 107. During the normal operation, when power is required of the engine to move the vehicle, the tension spring holds the foot pedal 98, and the clutch mechanism 97 in a retracted and disengaged position with the clutch drum 95. This allows the hydraulic brake to be disengaged from the shaft 91a, and shaft 91, and the wheels 107. When the conditions have changed to where it is desirable to restrain the movement of the vehicle, such as going down a steep incline, the foot pedal 98 is pushed forward and the clutch drum 95 is engaged to the shaft 91a through the clutch mechanism 97. This transmits the energy of the moving vehicle to the shaft 2, through the interconnecting sprockets 92 and 94 and the sprocket chain 93, turning it in a counterclockwise direction. As the energy is transmitted to the shell 3 and 4 by the rotor 1, through the action of the water contained in the hydraulic brake, the shell starts to turn, transmitting a tangential force on the braking surface 40, the tension on the spring 68 causes the braking mechanism, which is anchored to the frame 89 by the bearing 65, to automatically hold the shell to the extent that the hand wheel 62 and adjusting screw have previously been set, as above described. As the speed of the vehicle increases that of the brake rotor increases in proportion until the energy generated by the vehicle equals that dissipated by the hydraulic brake, at which time the velocity of the vehicle will be held constant or reduce to a lower desired speed, as described in the case of the hoist above, relieving the service brakes, not shown, of the work necessary and giving the operator greater control in the case of an emergency.

It will be noted that the work done by the hydraulic brake in the three examples of application noted; to wit, the hoist, the vehicle, and the prime mover test equipment, is identical in nature, comprising the dissipation of the energy of a source of power, namely, a gravity actuated load suspended by a cable, a moving mass on wheels, and a revolving shaft actuated by loaded pistons or electric current. These examples are set forth merely as such for the purpose of various illustrations of the invention as applied to various fields of operation and is not intended as a limitation on the field of operation of the invention.

The drawings and description disclose what is now considered to be a preferred form of the invention by way of illustration only, while the broad principle of the invention will be defined by the appended claims.

What we claim is:

1. A brake mechanism comprising a shell having a chamber for containing a liquid, a liquid in the chamber, a rotor mounted to rotate within the shell, baffles formed in the shell, the shell having inlet ports and discharge ports, impellers within the rotor formed in abrupt angular changing contours relative to the axis of the rotor, said impellers and baffles being so arranged that upon relative rotation of the shell and rotor recurrent circulation of the liquid within the shell will be induced, and simultaneously fluid will be discharged from the shell, and the flow of liquid will be induced into the shell.

2. A brake mechanism comprising a shell having a chamber for containing a liquid, a liquid in the chamber, a rotor mounted to rotate within the shell, baffles formed in the shell, the shell having inlet ports and discharge ports, impellers within the rotor formed in abrupt angular changing contours relative to the axis of the rotor, said impellers and baffles being so arranged that upon relative rotation of the shell and rotor recurrent circulation of the liquid within the shell will be induced, and simultaneously fluid will be discharged from the shell, and the flow of liquid will be induced into the shell, conduit means for said induction and expulsion of the liquid during rotation of the shell.

3. A brake mechanism comprising a shell having a chamber for containing a liquid, liquid in the shell, a rotor mounted to rotate within the shell, baffles formed within the shell, impellers formed within the rotor, whereby upon relative rotation of the shell and rotor circulation of the liquid will be induced to transmit energy from the rotor to the shell, and braking means for controlling the rotation of the shell, comprising a brake band having its two ends so connected that the energy in the shell will be transmitted to the brake band to control the rotation of the shell.

4. A brake mechanism comprising an enclosed shell for containing liquid, a rotor mounted to rotate in the shell, inner impellers mounted about the hub of the rotor, outer impellers arranged about the periphery of the rotor and whose inner ends are directed approximately tangentially with respect to their paths of rotation, deflecting vanes rotatable with the shell and arranged between the outer and inner impellers.

5. A brake mechanism comprising an enclosed shell for containing liquid, a rotor mounted to rotate in the shell, a series of inner impellers mounted about the hub of the rotor and arranged in a substantially tangential direction with respect to the hub, a series of outer impellers arranged about the periphery of the rotor and whose inner ends are directed approximately tangentially with respect to their paths of rotation, deflecting vanes rotatable with the shell and arranged between the outer and inner impellers.

6. A brake mechanism comprising an enclosed shell for containing liquid, a rotor mounted to rotate in the shell, inner impellers mounted about the hub of the rotor, outer impellers arranged about the periphery of the rotor and whose inner ends are directed approximately tangentially with respect to their paths of rotation, deflecting vanes rotatable with the shell and arranged between the outer and inner impellers, the mechanism being provided with an inlet and an outlet for a cooling liquid and having passageways providing for the circulation of a cooling liquid therethrough.

7. A brake mechanism comprising an inclosed shell for containing liquid, a rotor mounted to rotate in the shell, said rotor having peripheral pockets, inner impellers on the rotor arranged about the hub thereof, outer impellers on the rotor arranged about the periphery thereof and whose outer portions are formed with faces directed tangentially with respect to the hub and whose inner ends are turned in angular relation with said faces, the outer portions of the outer impellers being also provided with longitudinally inclined surfaces and having ports therethrough leading outwardly into said pockets, deflecting vanes rotatable with the shell and arranged between the outer and inner impellers.

8. A braking mechanism comprising a hydrodynamic brake of the character described having a rotatable shell constructed to contain liquid, a power driven shaft, a rotor rotatably mounted within the shell and connected to said shaft, baffles formed on the shell, impellers formed on said rotor comprising means for circulating the liquid in the shell for the dissipation of energy with varying speed-power ratio characteristics, means for selectively controlling the rotation of the shell for selectively varying the speed-power ratio of the brake mechanism for the dissipation of the power of said shaft.

9. In combination a power driven shaft and a hydraulic brake mechanism of the character described, said mechanism comprising a rotatable shell formed to contain a liquid, baffles in the shell, a rotor rotatively mounted within the shell and connected to said shaft, impellers formed on the rotor in radially staggered relation with said baffles, means for selectively controlling the rotation of the shell to automatically vary the amount of energy of the power driven shaft that is dissipated by the hydraulic brake.

10. A hydraulic braking mechanism comprising a shell for containing a liquid and a relatively rotatable rotor enclosed in the shell, a series of fixed impeller vanes on the rotor adjacent and tangential to its center to effect outward displacement of liquid upon rotation, another series of impeller vanes fixed on and adjacent to the periphery of the rotor and the inner ends of which are formed tangential to the center of the rotor to effect outward displacement of the liquid and the outer ends of which are formed tangential to the center of the rotor and also at an angle with the plane of rotation of the rotor to effect an inward and longitudinal displacement of the liquid upon rotation, the said shell forming channels for the circulation of the liquid induced by the rotor, and having a series of fixed turbine blades thereon and spaced concentric with the axis of rotation and spaced radially between the said series of rotor impeller vanes, and another series of turbine blades, the outer ends of which are longitudinally adjacent the periphery of the said rotor and are formed in contours varying from concentric with the axis of rotation and at varying angles with the plane of rotation to approximately radial at the center at their inner diameter, which is longitudinally adjacent the rotor inner series of impeller vanes, liquid in the shell, said liquid being circulated through the shell by the said impeller vanes, upon rotation of the rotor, to dissipate the energy of the rotor.

11. A hydraulic braking mechanism comprising a rotatable shell for containing a liquid and a relatively rotatable rotor enclosed in the shell, a series of fixed impeller vanes on the rotor adjacent and tangential to its center to effect outward displacement of liquid upon rotation, another series of impeller vanes fixed on and adjacent to the periphery of the rotor and the inner ends of which are formed tangential to the center of the rotor to effect outward displacement of the liquid and the outer ends of which are formed tangential to the center of the rotor and also at an angle with the plane of rotation of the rotor to effect an inward and longitudinal displacement of the liquid upon rotation, the said shell forming channels for the circulation of the liquid induced by the rotor, and having a series of fixed turbine blades thereon and spaced concentric with the axis of rotation and spaced radially between the said series of rotor impeller vanes, and another series of turbine blades, the outer ends of which are longitudinally adjacent the periphery of the said rotor and are formed in contours varying from concentric with the axis of rotation and at varying angles with the plane of rotation to approximately radial at the center at their diameter, which is longitudinally adjacent the rotor inner series of impeller vanes, liquid in the shell, said liquid being circulated through the shell by the said impeller vanes, upon rotation of the rotor, to dissipate the energy of the rotor and brake means for controlling the rotation of the shell to govern the energy dissipated.

REXFORD O. ANDERSON.
AMON H. CARSON.